United States Patent [19]

Akabayashi et al.

[11] 4,291,127

[45] Sep. 22, 1981

[54] PLASTICIZER COMPOSITION

[75] Inventors: Hiroshi Akabayashi; Eiji Ohyama; Susumu Shoji; Masami Adachi; Koretoshi Uemura, all of Tokyo; Yoshihisa Ogawa, Ichihara, all of Japan

[73] Assignee: Nissan Chemical Industries, Ltd., Tokyo, Japan

[21] Appl. No.: 145,696

[22] Filed: May 1, 1980

Related U.S. Application Data

[63] Continuation of Ser. No. 969,869, Dec. 15, 1979, abandoned.

[30] Foreign Application Priority Data

Dec. 23, 1977 [JP] Japan ............................ 52-155410

[51] Int. Cl.³ ............................................ C07C 69/80
[52] U.S. Cl. ...................................... 560/76; 536/344
[58] Field of Search .......................................... 560/76

[56] References Cited

U.S. PATENT DOCUMENTS

| 1,993,736 | 3/1935 | Graves et al. | 560/76 |
| 2,517,352 | 8/1950 | Reid | 560/76 |
| 2,610,201 | 9/1952 | Rutherford | 560/76 |
| 2,625,527 | 1/1953 | Smith et al. | 560/76 |
| 2,650,908 | 9/1953 | Beears | 560/76 |
| 2,792,417 | 5/1957 | Dean | 560/76 |
| 2,852,563 | 9/1958 | Hagemeyer | 560/76 |
| 3,094,503 | 6/1963 | Jacocks et al. | 560/76 |
| 3,736,348 | 5/1973 | Gough et al. | 560/76 |

*Primary Examiner*—Natalie Trousof
*Assistant Examiner*—Vera C. Clarke
*Attorney, Agent, or Firm*—Oblon, Fisher, Spivak, McClelland & Maier

[57] ABSTRACT

A plasticizer composition comprises phthalates of $C_9$ alcohols obtained by an oxo reaction and a hydrogenation of $C_8$ olefins which have 3 to 20 wt. % especially 7 to 20 wt. % of olefins having one isobutane skeleton and less than 3 wt. % of olefins having quaternary carbon and more than 90 wt. % of a total of n-octenes, monomethylheptenes and dimethylhexenes and more than 0.8 especially 1.1 to 2.0 of a ratio of a total of n-octenes and monomethylheptenes to dimethylhexenes.

4 Claims, No Drawings

PLASTICIZER COMPOSITION

This is a continuation of application Ser. No. 969,869, filed Dec. 15, 1979, now abandoned.

BACKGROUND OF THE INVENTION

1. Field of the Invention

The present invention relates to a plasticizer composition of phthalates of $C_9$ alcohols. More particularly, it relates to a plasticizer composition of phthalates of $C_9$ alcohols which give excellent antifreezing property and durability in ageing and other properties as a plasticizer.

2. Description of the Prior Arts

It has been known to use dioctyl phthalate (referring to as DOP) prepared from 2-ethylhexanol as a plasticizer, DOP has excellent characteristics of plasticizing efficient, antifreezing property and electric resistance (volume resistivity), however DOP has inferior durability in ageing (volatile loss).

It has been highly required to obtain a plasticizer having superior property than DOP from the viewpoints of long life of plastics.

It has been known that the durability in ageing (volatile loss) can be improved by using higher alcohols for the preparation of the plasticizer, and olefins for the preparation of phthalates have been studied.

Dinonyl phthalates (referring to as DNP) obtained from $C_4$ olefins obtained by various processes have significantly improved durability in ageing (volatile loss). However, dinonyl phthalates have not widely used as a plasticizer because either of antifreezing property, electric resistance, plasticizing efficiency or processability is highly inferior.

The known $C_8$ olefin or $C_8$ olefin compositions as a starting material for dinonyl phthalates include (1) 2,4,4-trimethylpentene as a dimer of isobutene; (2) $C_8$ fraction in polymerized gasoline prepared by using a solid phosphoric acid; (3) a dimer of n-butene obtained by using certain organoaluminum compound and nickel compound as a catalyst; and (4) $C_8\alpha$-olefin obtained by polymerization of ethylene.

The components of the known $C_8$ olefins or $C_8$ olefin compositions and plasticizing characteristics of the corresponding dinonyl phthalates and dioctyl phthalate (DOP) are shown in Table 1.

All of dinonyl phthalates has superior durability in ageing (volatile loss) to that of DOP.

However, dinonyl phthalates prepared from (1) 2,4,4-trimethylpentene or (2) the $C_8$ fraction of polymerized gasoline have inferior antifreezing property, plasticizing efficiency and processability whereas dinonyl phthalates prepared from (3) the dimer of n-butene or (4) the $C_8\alpha$-olefin have inferior electric resistance.

SUMMARY OF THE INVENTION

It is an object of the present invention to provide a plasticizer composition having superior durability in ageing as well as desirable antifreezing property, electric resistance, plasticizing efficiency or processability.

The foregoing and other objects of the present invention have been attained by providing a plasticizer composition which comprises phthalates of $C_9$ alcohols obtained by an oxo reaction of $C_8$ olefins which had 3 to 20 wt.% especially 7 to 20 wt.% of one isobutane skeleton and less than 3 wt.% of olefins having quaternary carbon and more than 90 wt.% of a total of n-octenes, monomethylheptenes and dimethylhexenes and more than 0.8 especially 1.1 to 2.0 of a ratio of a total of n-octenes and monomethylheptenes to dimethylhexenes.

DETAILED DESCRIPTION OF THE PREFERRED EMBODIMENTS

The inventors have studied relationship between structures of $C_8$ olefins as the starting material and physical properties of plasticizers of phthalates obtained from the $C_8$ olefins to obtain a plasticizer composition having excellent plasticizing efficiency, processability, electric resistance, antifreezing property, durability in ageing.

The present invention is based on the following findings.

When $C_8$ olefins obtained by a dimerization of the butene fraction are included in the following factors (I) to (IV), phthalates of $C_9$ alcohols (nonyl alcohols) obtained by an oxo reaction and a hydrogenation of the $C_8$ olefins can be a significantly superior plasticizer composition which has not disadvantages of the conventional dinonyl phthalates and DOP.

The satisfactory factors for the $C_8$ olefins are as follows.

(I) more than 3 wt.% preferably 7 to 20 wt.% of olefins having one isobutane skeleton in each molecular chain;

(II) less than 3 wt.% of olefins having quaternary carbon;

(III) more than 90 wt.% of a total of n-octenes, monomethylheptenes and dimethylhexenes; and (IV) more than 0.8 preferably 1.1 to 2.0 of a ratio of a total of n-octenes and monomethylheptenes to dimethylhexenes.

The n-octenes, monomethylheptenes, dimethylhexenes and $C_8$ olefins having one isobutene skeleton and $C_8$ olefins having quaternary carbon mainly have the following forms.

n-octenes
C—C—C—C—C—C—C—C monomethylheptenes

|   |   |
|---|---|
| C<br>\|<br>C—C—C—C—C—C—C | 2-methylheptene |
| C<br>\|<br>C—C—C—C—C—C—C | 3-methylheptene | dimethylhexenes

|   |   |
|---|---|
| C   C<br>\|   \|<br>C—C—C—C—C—C | 2,4-dimethylhexene |
| C   C<br>\|   \|<br>C—C—C—C—C | 3,4-dimethylhexene |

$C_8$ olefins having one isobutane skeleton

|   |   |
|---|---|
| C<br>\|<br>C—C—C—C—C—C | 2-methylheptene |
| C   C<br>\|   \|<br>C—C—C—C—C | 2,4-dimethylhexene |

$C_4$ olefins having quaternary carbon

|   |   |
|---|---|
| C   C<br>\|   \|<br>C—C . C—C—C<br>\|<br>C | 2,4,4-trimethylpentene |
| C   C<br>\|   \|<br>C—C . C—C—C<br>\|<br>C | 2,2,3-trimethylpentene |

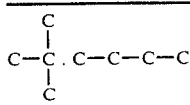

2,2-dimethylhexene

Double bond can be in suitable positions.

In the preparation of phthalates, the $C_8$ olefins are converted into the corresponding aldehydes by the conventional oxo reaction with a cobalt carbonyl catalyst and a mixed gas of hydrogen and carbon monoxide (1.0 to 1.5 vol. ratio of $H_2/CO$) under a pressure of 140 to 200 $Kg/cm^2$ Gauge at 130° to 180° C. and the aldehydes are hydrogenated with hydrogen to obtain the corresponding alcohols and the alcohols are esterified with phthalic anhydride to obtain phthalates of $C_9$ alcohols.

This process is well-known in the arts.

When the $C_8$ olefins defined above are used for the oxo reaction, the hydrogenation and the esterification, to obtain the phthalates of $C_9$ alcohols, a plasticizer composition having excellent characteristics of durability of ageing (volatile loss) as the advantage of dinonyl phthalate and excellent plasticizing efficiency, electric resistance can be obtained.

In the present invention, the above-mentioned four factors for defining the starting material of $C_8$ olefins are important. The most important factor is the factor (I) of the olefins having one isobutane skeleton. As shown in the following examples and references, dinonyl phthalate obtained from a dimer of n-butene have inferior electric resistance (vol. resistivity) whereby this can not be used as a plasticizer in electric insulators.

When the $C_8$ olefins containing more than 3 wt.% of olefins having one isobutane skeleton is used as shown in Example 1, electric resistance (vol. resistivity) of a plastic plasticized with the resulting phthalate is remarkably improved. On the other hand, the plasticizing efficiency and antifreezing property are slightly decreased depending upon increasing the content of the olefins having one isobutane skeleton, and the optimum content of the olefins having one isobutane skeleton is in a range of 7 to 20 wt.%.

The $C_9$ alcohols obtained by the oxo reaction and the hydrogenation of the $C_8$ olefins defined above usually have the following properties.

| | |
|---|---|
| specific gravity: | 0.832 to 0.835 |
| distillation IBP: | 196 to 198° C. |
| DP: | 201 to 203° C. |

The $C_9$ alcohols include the following components.

| | | |
|---|---|---|
| ① | $C_9$ alcohols having no branched chain | 2 to 6 wt. % |
| ② | $C_9$ alcohols having one branched chain | 50 to 65 wt. % |
| | monomethyl octanol | 40 to 50 wt. % |
| | monoethyl heptanol monopropyl hexanol | 10 to 15 wt. % |
| ③ | $C_9$ alcohols having two or three branched chain ($C_9$ alcohols having quaternary carbon less than 3 wt. %) | remainder |
| | Average number of branched chains in the $C_9$ alcohols | 1.3 to 1.7 |

The components of the $C_9$ alcohols can be determined by a silyation of the $C_9$ alcohols and a separation of the silyl components by a gas chromatography and a measurement by mass spectrum.

The average number of branched chains in the $C_9$ alcohols can be determined by NMR spectrum.

In the oxo reaction and the hydrogenation of the $C_8$ olefins, yield of the $C_9$ alcohols is greater than 85 mole %.

In the esterification of the $C_9$ alcohols to obtain phthalates of $C_9$ alcohols, yield of the phthalates is greater than 99.9%.

The antifreezing property and plasticizing efficiency are remarkably decreased by using the olefins having quaternary carbon as shown in the reference of dinonyl phthalate obtained from 2,4,4-trimethylpentene as a dimer of isobutene. Accordingly, the content of olefins having quaternary carbon should be decreased to less than 3 wt.% to obtain the phthalate which imparts satisfactory antifreezing property and plasticizing efficiency.

The $C_8$ olefins defined above can be obtained by a dimerization of butene fraction containing suitable content of isobutene. The mixed gas of isobutene and n-butene can be used as a starting material. The butene fraction can be a residual butene fraction obtained by separating butadiene from B—B fraction formed by an ethylene clacker.

The dimerization of the butene fraction containing isobutene can be carried out by using suitable catalyst for producing the $C_8$ olefins. The known catalysts for dimerization of butenes such as acidic catalyst of sulfuric acid or phosphoric acid are not suitable because a large amount of olefins having quaternary carbon is formed in the dimerization.

It is preferable to use the known catalyst for dimerization of a lower olefin such as alkylaluminum halide having the formula $(AlX_nR_{3-n})_2$ (n=1 to 3) together with a Group VIII metal compound such as nickel salts of fatty acid.

The present invention will be further illustrated by certain examples and references.

EXAMPLE 1

(1) Preparation of olefins

Five kinds of butene fractions having a ratio of isobutene and n-butene of 0.05 to 1.25 were used as starting materials.

Each dimerization of butenes was carried out as follows.

In an autoclave from which air and moisture were purged, 200 mg of nickel acetate, 75 ml of each butene fraction, 10μ liter of water and 0.47 ml of diethylaluminum chloride were charged and the mixture was stirred at 40° C. for 24 hours and the resulting liquid oligomer was distilled off to obtain $C_8$ olefins.

Amounts of olefins having isobutane skeleton included in the resulting olefin fractions are shown in Table 1.

TABLE 1

| Experiment No. | A | B | C | D | E |
|---|---|---|---|---|---|
| Weight ratio of isobutene/n-butene in starting material | 0.05 | 0.10 | 0.30 | 0.50 | 1.25 |
| Amount of $C_8$ olefin having one isobutane skeleton (wt. %) | 3.2 | 7.1 | 20.8 | 35.0 | 40.9 |

(2) Preparation of alcohols

In a 2 liter stainless steel autoclave equipped with a vertical stirrer, dicobalt octacarbonyl was dissolved in each olefin fraction at a ratio of 0.4% by weight and an oxo reaction was carried out in a batch system.

As a reaction condition, oxo gas containing hydrogen and carbon monoxide at a ratio of $H_2/CO$ of 1.3 by volume was charged to give a pressure of 160 $Kg/cm^2$ Gauge and the autoclave was heated at 150° C. to perform the oxo reaction. After 90 minutes, a gas absorption was substantially finished and the reaction was stopped. The catalyst was removed from the resulting reaction mixture and the product was washed with water.

In an autoclave, the product was admixed with 10 wt.% of a mixture of a copper chromite powdery catalyst and a nickel powdery catalyst and a hydrogenation was carried out at 170° C. under a hydrogen pressure of 50 $Kg/cm^2$ Gauge for about 120 minutes.

The catalyst was removed from the reaction mixture and then, unreacted olefins and by-products of high boiling materials were separated by a distillation to obtain $C_9$ alcohols.

In accordance with the conventional process, an esterification of the $C_9$ alcohols with phthalic anhydride was carried out, to obtain phthalates of the $C_9$ alcohols.

The phthalates as a plasticizer were blended to vinyl chloride resin ($\overline{P}=1450$), as follows.

| | |
|---|---|
| vinyl chloride resin | 100 wt. parts |
| barium stearate as stabilizer | 1.8 wt. parts |
| zinc stearate as stabilizer | 0.2 wt. part |
| phthalates of $C_9$ alcohols as plasticizer | 50 wt. parts. |

The resulting mixtures were molded and the physical properties were measured. The results are shown in Table 1.

EXAMPLE 2

Butene fraction obtained from FCC apparatus was used as a starting material. The butene fraction included 43.2 wt.% of n-butene, 12.7 wt.% of isobutene, 0.1 wt.% of butadiene and a residue of paraffins.

A selective hydrogenation of the butene fraction was carried out by using a Pd catalyst before a dimerization to remove butadiene.

In accordance with the process of Example 1 except using the selectively hydrogenated butene fraction, the dimerization of butenes to form dimers and the oxo reaction of the dimers to form $C_9$ alcohols and the esterification of $C_9$ alcohols to form phthalates of $C_9$ alcohols were carried out.

In the dimers, an amount of $C_8$ olefins having one isobutane skeleton was 19.7 wt.% and an amount of olefins having quaternary carbon was less than 3 wt.%.

The physical properties of the resulting phthalates as plasticizer are shown in Table 1.

TABLE 1

| | Exp. 1 | | | | | Exp. 2 |
|---|---|---|---|---|---|---|
| | A | B | C | D | E | F |
| Dimers of butenes as starting material | | | | | | |
| (1) n-octenes | 5.3 | 7.3 | 6.8 | 5.6 | 4.2 | 6.7 |
| (2) monomethylheptenes | 51.5 | 47.8 | 47.2 | 46.1 | 40.5 | 47.0 |
| (3) dimethylhexenes | 41.5 | 43.8 | 42.9 | 43.3 | 46.7 | 43.0 |
| (4) others | 1.7 | 1.1 | 3.1 | 5.0 | 8.7 | 3.3 |
| (5) olefins having one isobutane skeleton | 3.2 | 7.1 | 20.8 | 35.0 | 40.9 | 19.7 |
| (6) olefins having quaternary carbon | — | 0.5 | 1.7 | 2.9 | 5.1 | 2.2 |
| (1) + (2) + (3) | 98.3 | 98.9 | 96.9 | 95.0 | 91.3 | 96.7 |
| ((1) + (2))/(3) | 1.37 | 1.27 | 1.27 | 1.20 | 0.96 | 1.25 |
| Phthalate plasticizer | | | | | | |
| Plasticizing efficient 100% modulus ($Kg/mm^2$) | 1.05 | 1.06 | 1.08 | 1.11 | 1.13 | 1.07 |
| Antifreezing property (°C.) | −26.3 | −26.1 | −25.7 | −25.6 | −25.1 | −26.0 |
| Electric resistance (vol resistivity) (30° C. $10^{13}$ Ω cm) | 3.1 | 3.4 | 3.6 | 3.8 | 4.0 | 3.5 |
| Durability in ageing (volatile loss) (%) | 1.6 | 1.6 | 1.7 | 1.7 | 1.7 | 1.6 |

TABLE 1'

| Starting material | 2,4,4-trimethyl pentene | Reference Polymerized gasoline C₈ | C₈ α-olefin | dimer of n-C₄ | 2-ethyl hexanol |
|---|---|---|---|---|---|
| (1) n-octanes | | 1.1 | 100 | 4.5 | |
| (2) monomethylheptenes | | 9.2 | | 64.6 | |
| (3) dimethylhexanes | | 49.9 | | 30.0 | |
| (4) others | 100 | 39.8 | | 0.9 | |
| (5) olefins having isobutane skeleton | 0 | 30.9 | 0 | 0 | |
| (6) olefins having quaternary carbon | 98< | 21.3 | 0 | <0.3 | |
| (1) + (2) + (3) | 0 | 60.2 | 100 | 99.1 | |
| ((1) + (2))/(3) | — | 0.21 | — | 2.33 | |

| Phthalates plasticizer | dinonylphthalate | | | | DOP |
|---|---|---|---|---|---|
| Plasticizing efficient 100% modulus (Kg/mm²) | 1.34 | 1.17 | 1.05 | 1.03 | 1.04 |
| Antifreezing property (°C.) | 29.3 | −20.3 | −28.6 | −26.9 | −23.6 |
| Electric resistance (vol. resistivity) (30° C. 10¹³ Ω cm) | 5.0 | 2.5 | 0.9 | 1.8 | 4.0 |
| Durability in ageing (volatile loss) (%) | 4.5 | 2.8 | 1.5 | 1.5 | 7.8 |

Note:
Antifreezing property: Clashberg softening temperature
Durability in ageing: volatile loss percent after heating at 120° C. for 24 hours.

What is claimed is:

1. A plasticizer composition which comprises phthalates of C₉ alcohols obtained by an oxo reaction and a hydrogenation of C₈ olefins which have 3 to 40.9 wt.% of olefins having one isobutane skeleton and less than 3 wt.% of olefins having quaternary carbon and more than 90 wt.% of a total of n-octenes, monomethylheptenes and dimethylhexenes and 0.8–2.0 of a ratio of a total of n-octenes and monomethylheptenes to dimethylhexenes.

2. A plasticizer composition according to claim 1 wherein 7 to 20 wt.% of olefins having one isobutane skeleton is incorporated in the C₈ olefins.

3. A plasticizer composition according to claim 1 wherein the ratio of a total of n-octenes and monomethylheptenes to dimethylhexenes in the C₈ olefins is in a range of 1.1 to 2.0.

4. A plasticizer composition according to claim 1, wherein 3 to 20 wt.% of olefins having one isobutane skeleton is incorporated in the C₈ olefins.

* * * * *